United States Patent [19]

Semedard et al.

[11] Patent Number: 4,640,480

[45] Date of Patent: Feb. 3, 1987

[54] DEVICE FOR SUPPORTING PIPES HAVING A LOW THICKNESS

[75] Inventors: Jean-Claude Semedard, Paris; Jean-Jacques Marsault, St Arnould en Yvelines; Jean-Pierre Peyrelongue, Pontchartrain; Gérard Vallée, Viroflay, all of France

[73] Assignee: Stein Industrie, Velizy Villacoublay, France

[21] Appl. No.: 762,246

[22] Filed: Aug. 5, 1985

[30] Foreign Application Priority Data

Aug. 8, 1984 [FR] France ............................ 84 12539

[51] Int. Cl.⁴ .......................................... F16L 3/00
[52] U.S. Cl. ........................................ 248/62; 24/19;
24/205; 248/49; 248/65; 248/DIG. 1
[58] Field of Search .................... 248/62, 58, 317, 323,
248/74.1, 74.2, 65, 49, 73, 55, 64, DIG. 1, 67.7;
403/64, 65, 175; 285/61; 24/19, 205, 285

[56] References Cited

U.S. PATENT DOCUMENTS

| | | | |
|---|---|---|---|
| 3,112,909 | 12/1963 | Suozzo et al. | 248/58 |
| 4,004,768 | 1/1977 | Evans et al. | 248/59 |
| 4,012,470 | 3/1977 | Thayer | 248/74.1 X |
| 4,134,563 | 1/1979 | Pollono | 248/58 |
| 4,384,696 | 5/1983 | Blake | 248/DIG. 1 X |
| 4,485,994 | 12/1984 | Anglaret et al. | 248/DIG. 1 X |
| 4,516,750 | 5/1985 | Brunner | 248/DIG. 1 X |

*Primary Examiner*—Ramon O. Ramirez
*Attorney, Agent, or Firm*—Sughrue, Mion, Zinn, Macpeak & Seas

[57] ABSTRACT

The present invention relates to a device for supporting a pipe (1) which has a low thickness in relation to its diameter and which is subjected to considerable variations in temperature and to a radial traction stress of a known direction. It comprises:

(a) support cradles (2A, 2B, 2C, 2D) having an internal profile with a curve radius close to that of the pipe;

(b) a rigid half-collar (7) arranged around the pipe and separated from its periphery and on which certain of the cradles are fixed;

(c) two articulated arms (5A, 5B) on the ends of the half-collar and on which the other cradles are fixed; and (d) a connection device (9A, 9B, 10, 11) formed by two other arms (9A, 9B) which are articulated on the one hand on the above-mentioned arms and on the other hand on pivot pin (10) on which is exerted the radial traction stress applying tightening on the pipe under the force of radial traction (F) applied to the pipe and independently of the expansion of the pipe.

7 Claims, 1 Drawing Figure

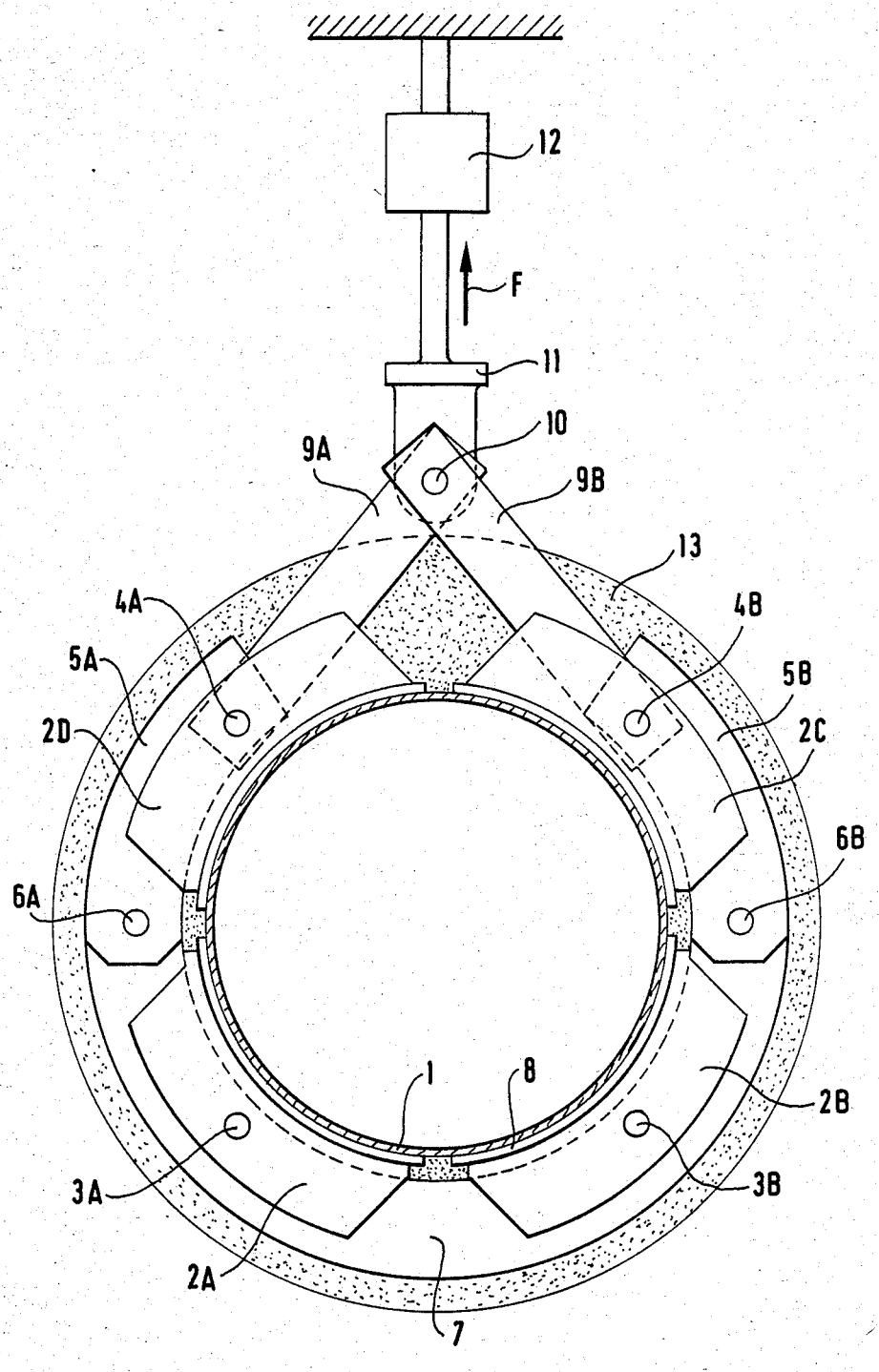

DEVICE FOR SUPPORTING PIPES HAVING A LOW THICKNESS

The present invention relates to a device for supporting a pipe having a low thickness in relation to its diameter, which is subjected to considerable temperature variations and to a radial traction force of a known direction.

In their patents FR-A-2 443 011 and 2 499 202, applicants have proposed devices which are in particular appropriate for supporting or fixing pipes for the transport of liquid sodium in nuclear reactor regenerator plants.

These devices comprise components for stress recovery which are soldered on the pipes and are formed by circular lugs which engage in holes of elastic blades which are soldered at at least one of their ends to radial bands of a rigid collar surrounding the pipe. They necessitate a relative large number of solderings, such that their placing is lengthy and burdensome.

In their French Patent Application No. 84 08 788 of June 5, 1984, applicants also proposed a device which maintains pipes without play and without producing any excessive restraints therein, whatever the diametric expansions and stresses applied, and without requiring stress recovery devices to be soldered on the pipe, which is simple and quick to place and which enables adjustment of the degree of clamping of the pipe.

The above-mentioned device is conceived for fixing of a pipe which is subjected to considerable temperature variations and to any radial orientation stresses whatever. It is above all appropriate for the support of a pipe subjected to considerable temperature variations and to a radial traction stress of a known direction.

The object of the present invention is to provide a simpler support device for use in the case of radial traction stress of a known direction. A further object of the invention is to provide a support device for a pipe having a low thickness in relation to its diameter, which maintains the pipe without play and without producing any excessive restraints therein, whatever the diametric expansion and the radial traction stress applied in a known direction, without requiring stress recovery devices to be soldered onto the pipe, which are put in place easily and quickly, and which enable heat insulation of the pipe even at the location where it is placed.

The device in accordance with the invention is characterized in that it comprises:

(a) support cradles with an internal profile having a curve radius close to that of the pipe;

(b) a rigid half-collar arranged around the pipe and separated from its periphery, on which certain of the cradles are fixed;

(c) two articulated arms on the ends of the half-collar, on which the other cradles are fixed; and (d) a connection device formed by two other arms which are articulated on the one hand on the above-mentioned arms and on the other hand on an axis on which the radial traction stress is exerted.

In addition, it preferably responds to at least one of the following characteristics:

The curve radius of the internal profile of the cradles is slightly greater than that of the pipe, when cold.

The cradles are coated on the surface which contacts the pipe with a layer of an elastic crushable material and which is heat-resistant.

The elastic crushable material is a compressed knit in a fine metallic thread.

The cradles are fixed pivotably on the rigid half-collar and the articulated arms.

The cradles, the half-collar and the articulated arms are arranged inside a heat insulator surrounding the pipe, and the connector device comes out on the exterior of this heat insulator.

The connector device is connected to static support components by means of a cap which is fixed on it.

By way of example and with reference to the single attached drawing, a support device for a pipe transporting molten alkaline metal, such as sodium, for an electricity production plant with a regenerator reactor, is described below. It is known that the temperature of such pipes can change very rapidly, by 100° or 200° C. in a few minutes.

The drawing shows a diametric cross-section of the device, along a straight cross-section of the pipe.

Pipe 1, which has a large diameter, on the order of 700 to 1000 mm, and whose wall has a low thickness, from 10 to 20 mm, is contained by four cradles 2A, 2B, 2C, 2D, which are regularly arranged on its periphery and which have a radius of curvature slightly greater than that of the pipe when cold and possibly equal to the maximum radius of the pipe when hot. The lower cradles 2A, 2B are connected by means of pivoting axes 3A, 3B of a rigid half-collar 7. The other two cradles are connected by means of pivot pins 4A, 4B of two arms 5A, 5B which are articulated at 6A, 6B on the rigid half-collar 7. All the cradles are coated on their surface which is on the side of the pipe with a layer 8 of a material capable of elastic crushing and which is heat-resistant, such as a compressed knit in a fine stainless steel thread, which is resistant to 500° C. while retaining its properties.

A connection device, composed of two arms 9A and 9B which are articulated at 10 and are connected to the articulated arms 5A and 5B by means of pivot pins 4A and 4B, tends to close together arms 5A and 5B insofar as the angle formed by arms 9A and 9B with 5A and 5B, respectively, is correctly selected. This enables cradles 2C and 2D to be applied on the pipe with a tightening force dependent upon the traction force applied at 10 and on the geometric characteristics of the support device.

A cap 11 which is connected to pivot pin 10 provides the attachment of the support device to a support component 12, for example variable or constant supports.

The pipe is surrounded by a heat insulator 13 in which the cradles, half-collar, arms 5A and 5B, the major part of arms 9A and 9B are bedded, and on the outside of which only the cap 11 and the pivot pin 10 are located.

It can be seen that if the pipe expands or contracts radially due to a change in temperature of the molten metal circulating therein, the rigid maintenance without play of the pipe is preserved by the action of force F.

The possibility of pivoting around axes 3A, 3B, 4A and 4B which is provided to the cradles 2A, 2B, 2C and 2D enables the preservation of a centered contact between the pipe and said cradles, whatever the variations in shape of the pipe and whatever the small thermal deformations of the half-collar 7. Moreover, the arrangement of the four cradles at 90° from each other provides compensation for a tendency of the pipe to become oval under the tightening stress.

While device described above by reference to the drawing appears to be the preferred embodiment of the invention, it will be understood that various modifications can be made thereto without departing from the spirit of the invention, with certain components able to be replaced by others which would play a similar technical role. In particular, the number of cradles can be modified. The half-collar could occupy a fraction, greater or less than 180°, of the periphery of the pipe. The number of articulated arms could be increased.

What is claimed is:

1. A device for supporting a pipe (1) of given radius of curvature which has a low thickness in relation to its diameter and which is subjected to considerable variations in temperature and to a radial traction stress of a known direction, said device comprising:
   (a) a number of support cradles (2A, 2B, 2C, 2D) having an internal profile with a radius of curvature close to that of the pipe;
   (b) a rigid half-collar (7) for mounting around a portion of the pipe and separated from the pipe periphery, certain of the cradles being mounted to said rigid half-collar for internal profile contact with the periphery of said pipe;
   (c) two first arms (5A, 5B) articulated on the ends of the half-collar (7), other of said cradles being mounted to said arms for internal profile contact with the periphery of said pipe; and
   (d) a connection device (9A, 9B, 10, 11) comprising two second arms (9A, 9B), said two second arms being articulated at one end on said first mentioned arms, respectively and at the other and commonly on a pivot pin (10), and means for exerting a radial traction stress to said second arms for tightening said cradles about the pipe under the force of radial traction (F) applied to the pin and independently of the expansion of the pipe.

2. The device of claim 1, wherein the radius of curvature of the internal profile of cradles (2A, 2B, 2C, 2D) is slightly greater than that of the pipe when cold.

3. The device of claim 1, wherein the cradles are coated on their surface adapted to contact the pipe with a layer (8) of a material capable of elastic crushing and which is heat-resistant.

4. The device of claim 3, wherein the material capable of elastic crushing is a compressed knit in a fine metallic thread.

5. The device of claim 1, wherein the cradles are pivotably mounted by pivot pins (3A, 3B, 4A, 4B) on the rigid half collar (7) and on the articulated arms (5A, 5b).

6. The device of claim 1, wherein the cradles, the half-collar and the articulated arms are arranged inside a heat insulator (13) adapted to surround the pipe.

7. The device of claim 1, wherein the connection device is connected by a cap (11) to a static support component (12).

* * * * *